July 10, 1945.  A. L. NEWCOMB  2,380,065
APPARATUS FOR WASHING AIR, GASES, OR VAPORS
Filed Dec. 5, 1942
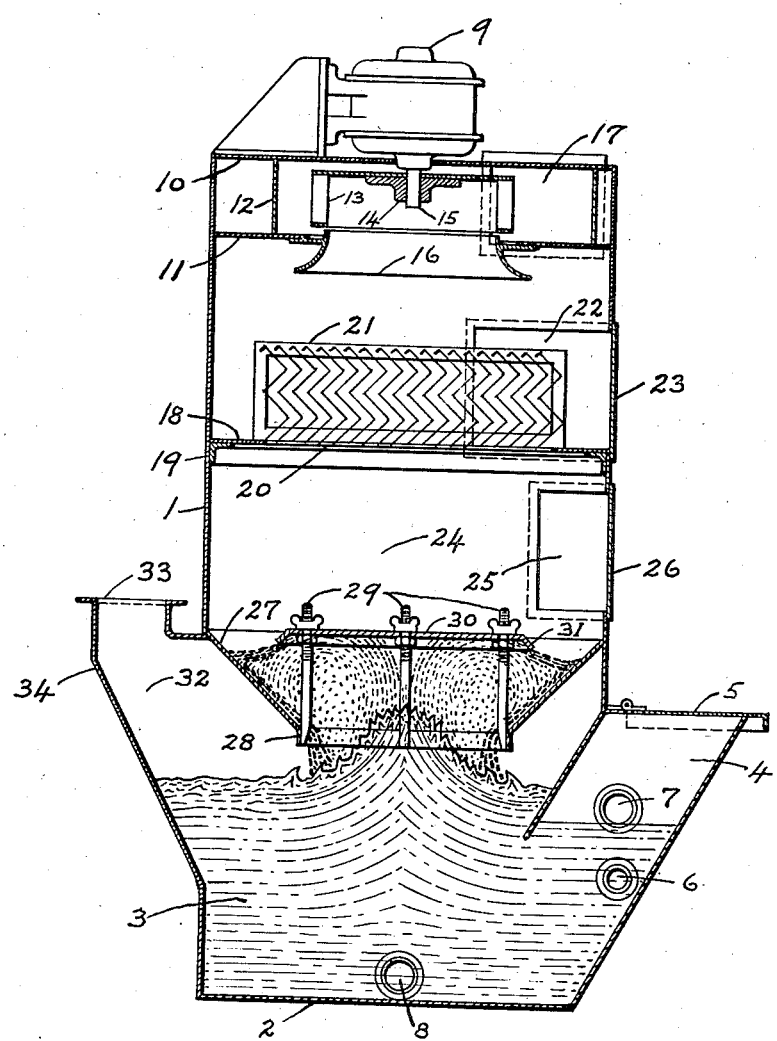
INVENTOR.
Avon L. Newcomb.
BY Patented July 10, 1945

2,380,065

UNITED STATES PATENT OFFICE 2,380,065

APPARATUS FOR WASHING AIR, GASES, OR VAPORS

Avon Lockhart Newcomb, Birmingham, Mich., assignor to Newcomb-Detroit Company, Detroit, Mich.

Application December 5, 1942, Serial No. 467,944

6 Claims. (Cl. 183—22)

This invention relates to means for the safe and effective removal of particles, such as explosive dusts which are produced in the grinding of or otherwise shaping magnesium alloys, or dusts of other combustible substances, or inert dusts such as sand, dirt and other solids, or droplets such as paint, oil, and other liquids, from air or other gases or vapors. For simplicity this application hereinafter describes and illustrates apparatus for washing dust out of air by means of water; it being understood that other suspended substances can be similarly removed from gases or vapors by washing with liquids other than water.

More particularly this invention relates to the means used for mixing a stream of air, carrying dust in suspension, with water picked up in a dense spray by the moving air, whereby the air and water are so thoroughly intermingled that practically all the dust is eliminated and the air leaves the washing compartment in a purified condition.

One object of my invention is to raise water in an approximately conical heap immediately below an orifice by means of reduced air pressure in a superimposed chamber or space whereby the suction and the resulting air flow converging upwardly into the orifice will keep the heap of water in a violently agitated condition and scour spray from its surface.

Another object of my invention is to cause dust laden air commingled with a dense spray of water to impinge against a surface, such as a sheet of metal, and thereby press the dust and water together in order to ensure that the dust particles are thoroughly wetted.

A further object of my invention is to cause the water rebounding from the surface against which it is impinged to be deflected in a direction transverse to air flow, in such manner that wetted dust particles are propelled by the rapidly moving deflected water against a suitably located surface along which the water descends to a tank collector.

The advantages of this apparatus will be apparent from the following description of an embodiment of my invention and the novel features are clearly set forth in the appended claims.

In the accompanying drawing the figure is a sectional elevation of a device constructed in accordance with the invention.

Referring to the drawing and to the designating numerals thereon, 1 indicates a casing which may be of any suitable shape but for example is illustrated as cylindrical. The lower end of the casing is closed, as by the base sheet 2, so as to form a water reservoir 3 which is also used as a sludge tank for the collection of materials washed out of air. These materials settle to the bottom of the reservoir and can be removed as and when required through a suitable clean out passage as at 4 having sides projecting from and welded to the casing 1 and provided with closing means such as the hinged lid 5.

Water is supplied to the reservoir 3 from any suitable source, such as a service pipe connected to the side of the reservoir to deliver water through the opening 6, which can be fitted with a float valve, not shown, to maintain a suitable level in an ordinary well known manner. Water can leave the reservoir 3 through an overflow opening 7, or can be drained through the opening 8 near the base sheet 2.

A source of power such as an electric motor 9 is mounted at the top of the casing 1. The top of the casing 1 is closed, as by a sheet of metal 10, below which a parallel sheet of metal 11 is provided at a suitable vertical distance.

Between the metal sheets 10 and 11 an involute fan housing is formed by the scroll sheet 12, within which a fan impeller 13 is placed and secured by a hub 14 keyed to the shaft 15 of the motor 9. An inlet 16 is provided to admit air to the impeller 13 and an outlet 17 is provided for the discharge of air. The arrangement of the motor driven centrifugal fan shown is merely illustrative, as other arrangements can be used such for example as a centrifugal fan with a horizontal axis or alternatively an axial flow fan. Also it is not essential that the fan should operate as an exhauster as shown, as a blower type of fan could be employed located elsewhere than as shown and delivering air to my device instead of withdrawing air from it. A fan operating as an exhauster is preferable for this service, because it receives clean air and is, therefore, not subjected to the abrasive effect of dust particles moving at high velocities.

At a suitable distance below the metal sheet 11 another sheet of metal forming a shelf 18 is placed, supported as by an angle iron ring 19 fastened to the casing 1. This shelf is provided with an opening 20 having an adequate area for the volume of air to be dealt with by my device.

On the shelf 18 a suitable liquid eliminator 21 may be placed and may be withdrawable through the opening 22 covered by the door 23.

Below the shelf 18 is a mist chamber 24, access to which may be had by an opening 25 covered by the door 26.

At the bottom of the mist chamber 24 is a boundary sheet of metal which may be in the form of a truncated cone 27 terminating in an orifice such as the annular ring 28 to which may be fastened several vertical rods 29 threaded at their upper ends and provided with retaining means such as wing nuts and ordinary nuts arranged respectively above and below and supporting a sheet metal plate of circular or other shape such as the disc 30 preferably provided with a bevelled rim 31 inclined at an angle of approximately 90 degrees to the inner surface of the truncated cone 27. The axis of the truncated cone 27 passes through the center of the disc 30, thereby causing the disc 30 to be concentrically positioned within the truncated cone 27.

Below the truncated cone 27 and above the surface of the water in the reservoir 3 is a space 32 circumferentially bounded by the casing 1 containing dust laden air which enters through an inlet opening 33 into a side passage 34, the walls of which are welded, or otherwise joined, to the casing 1.

The arrangement of the inlet 33 shows a method of introducing air which is to be purified, adapted to the use of an extraneous duct system collecting dust laden air from various sources, as the terminal duct of such a system can be suitably joined to a flange around the inlet 33. Other methods of admitting air to my device can be used, as for example a large opening can be provided in the side passage 34 through which air to be purified can enter from an adjoining space such as a paint spray booth, without the use of any ducts.

The operation of my device is as follows:

The reservoir 3 is filled to a desired level with water, after which the float valve, not shown, fitted to the supply opening 6 will maintain the water level for which it is adjusted. Adjustment can be such that the float valve will not be fully closed when the surface of the water is at the level of the lowest portion of the circumference of the overflow opening 7 and this will permit water to be constantly supplied to the reservoir 3 in sufficient quantity to prevent undue concentration of solids in suspension in the water within the reservoir and to replace the water lost by evaporation.

Auxiliary appliances such as solenoid valves, not shown, can if desired be provided in the extraneous water supply and overflow lines, in series with the fan motor 9, so that water will only flow when the motor is operating.

The motor 9 is started and the fan impeller 13 is rotated at a suitable speed. Air is withdrawn from the space within the casing 1, thereby creating a partial rarefaction which causes air to flow into my device through the inlet 33 to the space 32.

Due to the downward direction of the entering air the relatively large and heavy dust particles carried in suspension plunge into the water in the reservoir 3 and gravitate to the base 2.

The air then flows from the space 32 above the mean level of the water therein converging through an orifice such as the annular ring 28 into the hollow within the truncated cone 27, carrying with it the lighter dust still in suspension.

As the air stream at suitably high velocity converges within the annular ring 28 and rushes upwards into the mist chamber 24, it raises the water in the reservoir 3 into an irregular heap in an agitated condition as shown in Figure 1 and spray is copiously picked up by the air from the wavelets on the surface of the water.

The upwardly moving air carrying the dust still in suspension and water spray strikes a surface such as the sheet metal disc 30, the impact compressing the dust and water particles together, whereby the dust particles are thoroughly scrubbed with water and wetted.

The mixture of air, light dust, and water spray moves radially outward in all directions along the lower surface of the disc 30 and the water carrying the wetted dust is deflected by the bevelled rim 31 and is thereby caused to impinge at a high velocity and at an angle of approximately 90 degrees against the upper surface of the truncated cone 27.

The impact of impingement against the truncated cone 27 again compresses the dust and water particles together and most of the water carrying with it most of the dust flows down the upper surface of the truncated cone 27 and falls into the reservoir 3 where the dust settles to the base 2.

The water descends in a circular curtain from the annular ring 28 which terminates the truncated cone 27 and in falling through the stream of air which is entering the annular ring some of the water is whirled upward and again strikes the lower surface of the disc 30.

This upward re-entry of water within the annular ring 28, its separation into drops due to the swiftly moving air, and the collision of these drops with the water spray picked from the surface of the heap of water as previously described produces fine atomization. The air and water spray swirl in a very turbulent condition in the space below the disc 30.

The air in passing from the space below the disc 30 to ascend into the mist chamber 24 is compelled to pass transversely through the water which is projected from the rim 31 to the truncated cone 27. The area of the gap between the rim 31 and the truncated cone 27 is of prime importance and it is determined on the basis of providing not less than the required critical air velocity at this point. It has been found that this air velocity should not be less than 1200 feet per minute through the full area of said gap, without any allowance for the reduction in effective area caused by the water which is projected across said gap uniformly when the fan is in operation. If the air velocity is too low, water will not be uniformly projected across the gap at all points and dust laden air will pass through any portions of the gap devoid of water, without being subjected to cleansing.

The mist chamber 24 contains water particles carried into it by the ascending air which constitute nuclei for the adhesion of any remaining finely divided float dust which due to its very low inertia may have changed direction of movement almost as quickly as air and escaped impingement successively against the surface of the water in the reservoir 3, against the lower surfaces of the disc 30 and against the upper surface of the truncated cone 27.

The air passes from the mist chamber 24 through the eliminator 21 where entrained water is removed and thence to the fan impeller 13 from which it is discharged in a purified condition through the outlet 17.

The invention has been described in connection with an embodiment which has been found useful in removing dust from air, and with an alteration of the air inlet as herein mentioned in removing atomized paint from air. It will be obvious that devices constructed in accordance with this invention can also be used for cleaning various gases or vapors by means of various liquids. It will also be understood that while I have herein described and illustrated one embodiment of my invention, variations in design and construction can be made without departing from the spirit and essence of the invention. For instance, the casing can be rectangular in horizontal cross section instead of circular as shown; the interior partition 27 can be in the form of a truncated pyramid or alternatively a truncated cone; and other means can be used for removing entrained water from the leaving air instead of the eliminator 21. Also a number of truncated cones or pyramids instead of only one can be placed within a casing and used with one or more fans in a single apparatus or unit. Furthermore one or more units can be connected to one or more extraneously placed fans which can be either of the exhauster or blower type.

Having described my invention, what I claim and desire to secure by Letters Patent of the United States is:

1. An apparatus for washing air comprising a casing through which air is caused to flow, having a lower portion forming a reservoir with a body of water therein, and within said casing a hollow truncated cone terminating at its lower end in a neck bounding an orifice which is positioned above and adjacent to the surface of the water in said reservoir, a horizontal flat circular plate with a downwardly inclined bevelled rim concentrically positioned within said truncated cone and above said orifice, the said bevelled rim presenting a surface substantially normal to the interior surface of said truncated cone, an eliminator positioned above said flat circular plate and means for causing flow of air at suitably high velocity through said casing whereby spray is copiously picked up by said air from the surface of the water in said reservoir and is caused to successively pass through said orifice, impinge against said flat circular plate and thence be projected in a dense sheet against the inner surface of said truncated cone.

2. An apparatus for washing air comprising a shell with its lower portion adapted to contain a liquid, partition means within said shell in the form of a truncated cone with an orifice at its lower end, said orifice being above the surface of a body of liquid in the lower portion of said shell and adjacent thereto, a horizontal disc deflector with a downwardly flaring rim substantially perpendicular to the inner surface of said truncated cone, an eliminator placed beyond said disc deflector in the direction of air flow, and fan means for causing air to enter said apparatus and to flow over the surface of said liquid and pick spray therefrom, said air carrying spray in suspension then moving swiftly upward through said orifice and impinging against said disc deflector, the spray being projected outwardly therefrom in a dense sheet to the inner surface of said truncated cone and the air being forced to flow transversely through said sheet of spray and thence through said eliminator.

3. In an air washer comprising an enclosing casing through which air is caused to flow by fan means, a lower portion of said casing constituting a reservoir containing a body of water, funnel shaped partition means separating the lower portion of said casing from its upper portion, said partition means terminating at its lower end in an orifice positioned above the mean level of the surface of said water and adjacent thereto, a disc deflector with a downwardly inclined periphery positioned above said orifice and within said casing in such manner that an annular gap is provided between the circumference of said disc deflector and the inner surface of said funnel shaped partition means for upward air flow, and an eliminator placed beyond said disc deflector in the direction of air flow, whereby air is caused to swiftly flow sequentially above the surface of said body of water, then up through said orifice taking with it spray copiously picked from the surface of said water immediately below said orifice, the mixture of air and spray then impinging against the underside of said disc deflector, the air then flowing upwardly through said annular gap which surrounds said disc deflector and passing transversely through densely compacted spray which is projected from the periphery of said disc deflector across said annular gap, the air subsequently flowing through said eliminator.

4. In an air cleaning apparatus comprising an enclosing casing through which an air stream is caused to flow by a fan, a reservoir containing a liquid, boundary means above the surface of said liquid containing an orifice which gives access to an upper compartment within said casing, said boundary means increasing in cross sectional area in the direction of air flow, and a deflector having substantially the form of an inverted circular dish with its downwardly sloping peripheral portion inclined at an angle of approximately 45 degrees to a horizontal plane, said deflector being positioned above said orifice and concentrically within said upper compartment, and said deflector being of such size as to provide a gap for air flow between its perimeter and the interior surface of said upper compartment of such predetermined cross sectional area in relation to the volumetric capacity of said air stream as to produce not less than the required critical air velocity through said gap, whereby said air stream enters said casing and flows above the surface of said liquid and converges at suitably high velocity into said orifice to agitate thereunder the surface of said liquid and to copiously pick spray therefrom, said spray being impinged against the underside of said deflector and flowing outwardly from its perimeter in a dense stream across said gap to the inside surface of said upper compartment, and said air stream flowing through said gap in a direction transverse to the direction of flow of said dense spray stream.

5. In apparatus of the class described a casing divided by partition means into a lower and an upper portion, the said lower portion being adapted to contain a liquid which has a predetermined surface level maintained by a controlled liquid supply and a fixed run off level for outflow, the said partition means being conical in formation and terminating at its lower end in a ring enclosing an orifice, said orifice being above and adjacent to the surface of said liquid, a deflector having the shape of an inverted circular dish with a downwardly flaring rim situated above said orifice in such manner as to provide an annular gap for air flow at or above the required critical velocity between the rim of said deflector and the inner surface of said partition means, an eliminator positioned above said deflector, and fan means capable of causing a stream of air to flow over the surface of said liquid without submersion and then to pass through said orifice at sufficient velocity to cause said liquid to be raised in an irregular heap thereunder, said air stream picking spray from said head in sufficient quantity to copiously impinge against the underside of said deflector and thence be projected in a dense sheet or curtain across said annular gap, whereby said air stream in flowing through said gap is caused to flow at an obtuse angle to the direction of flow of said spray curtain and to thereby cause forceful collision of said air and spray streams.

6. An air washing apparatus comprising in combination a container having a liquid reservoir therein, said container having air entrance and exit openings and having an upper interior portion in the form of a truncated cone terminating at its lower end in an orifice positioned above the surface of a body of liquid placed in the lower portion of said container, disc deflector means with a downwardly inclined bevelled rim positioned above said orifice and concentrically within said upper interior portion of said container, eliminator means positioned above said disc deflector, and means for causing air to flow through said apparatus whereby spray is picked up from the surface of said liquid solely and entirely by said air flow and is caused to wash the air which passes through said apparatus.

AVON LOCKHART NEWCOMB.